(12) United States Patent
Ianello

(10) Patent No.: US 6,622,976 B1
(45) Date of Patent: Sep. 23, 2003

(54) CABLE HANGER FOR INSTALLING CABLES ON TRANSMITTING TOWER

(76) Inventor: Daniel J. Ianello, 2002 Belmont Ct., Mishawaka, IN (US) 46544

( * ) Notice: Subject to any disclaimer, the term of this patent is extended or adjusted under 35 U.S.C. 154(b) by 0 days.

(21) Appl. No.: 10/184,432

(22) Filed: Jun. 27, 2002

Related U.S. Application Data

(60) Provisional application No. 60/323,208, filed on Sep. 18, 2001.

(51) Int. Cl.[7] ................................ F16L 3/08; F16L 3/13
(52) U.S. Cl. ........................... 248/73; 248/71; 248/74.2
(58) Field of Search ..................... 248/67.7, 71, 72, 248/73, 74.1, 74.2, 218.4, 316.7, 60, 63, 230.7, 68.1; 24/338, 339; 174/45 R, 45 TD

(56) References Cited

U.S. PATENT DOCUMENTS

| | | | | |
|---|---|---|---|---|
| 2,166,916 A | * | 7/1939 | Lombard | 248/73 |
| 2,382,945 A | * | 8/1945 | Trafton | 24/16 R |
| 2,746,110 A | * | 5/1956 | Bedford, Jr. | 211/26.2 |
| 3,301,514 A | * | 1/1967 | Sugaya | 248/73 |
| 3,444,596 A | * | 5/1969 | Soltysik | 248/73 |
| 3,536,281 A | * | 10/1970 | Meehan et al. | 248/73 |
| 4,011,397 A | * | 3/1977 | Bouche | 174/42 |
| 4,763,132 A | | 8/1988 | Juds et al. | 343/890 |
| 5,393,021 A | | 2/1995 | Nelson | 248/71 |
| 5,794,897 A | | 8/1998 | Jobin et al. | 248/74.4 |
| 5,873,550 A | * | 2/1999 | Phillips | 248/73 |
| 5,921,520 A | * | 7/1999 | Wisniewski | 248/316.1 |
| 6,161,804 A | | 12/2000 | Paske et al. | 248/74.1 |
| 6,220,554 B1 | * | 4/2001 | Daoud | 248/74.1 |
| 6,257,530 B1 | * | 7/2001 | Tsai | 248/74.2 |
| 6,334,242 B1 | * | 1/2002 | Scollard et al. | 24/459 |
| 6,354,543 B1 | * | 3/2002 | Paske | 248/68.1 |

* cited by examiner

*Primary Examiner*—Ramon O. Ramirez
*Assistant Examiner*—Jon Szumny
(74) *Attorney, Agent, or Firm*—Botkin & Hall, LLP

(57) ABSTRACT

A cable hanger is attached to a transmitting tower with a "snap-in" connection and permits a cable or cable guide to be installed in the cable hanger through a gap provided in the arms of the cable hanger immediately after the cable hanger is installed on the tower. The hanger includes a clasp which is closed across the gap and around the cable which insures that the cable remains in the hanger and biases the snap fitting of the cable guide against an installation aperture of the tower, thereby securing the cable guide in place.

12 Claims, 5 Drawing Sheets

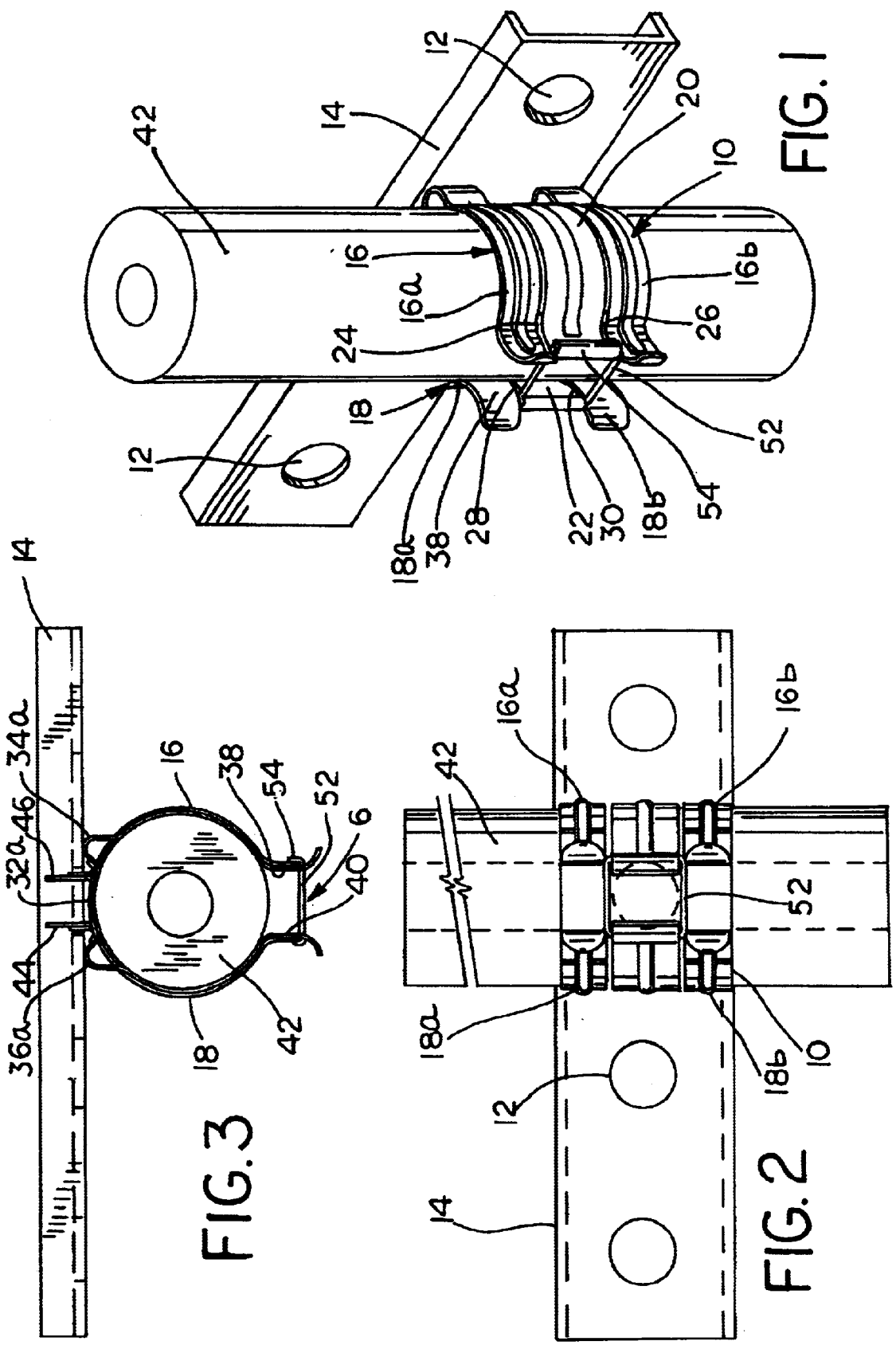

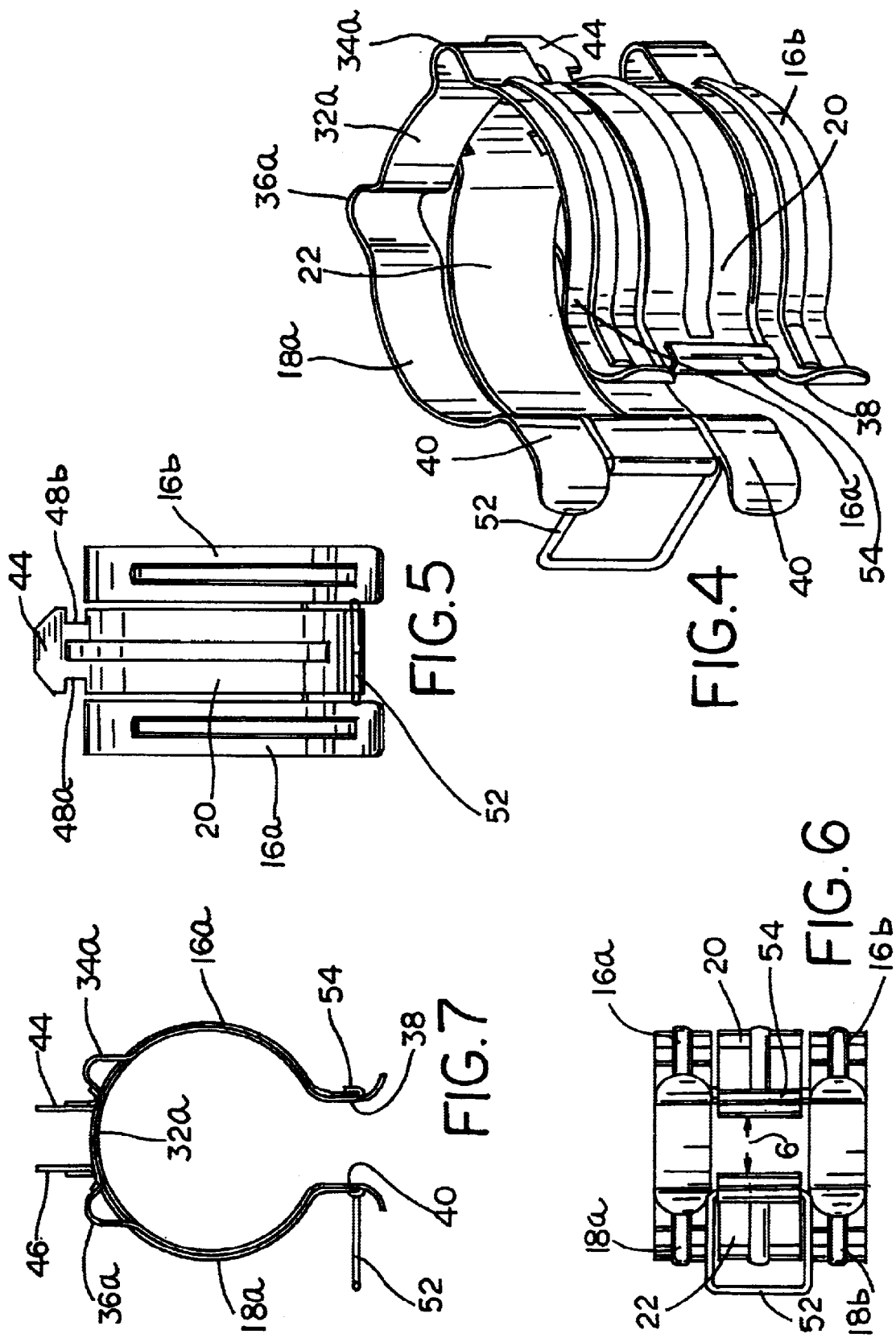

CABLE HANGER FOR INSTALLING CABLES ON TRANSMITTING TOWER

CROSS REFERENCED TO RELATED APPLICATION

This is a continuation of U.S. Patent Provisional Application 60/323,208, filed Sep. 18, 2001.

FIELD OF THE INVENTION

This invention relates to a cable hanger for securing cables to a transmission tower.

BACKGROUND OF THE INVENTION

Transmitting antennas are supported adjacent the top of a free-standing tower to transmit cellular, broadcasting, and similar signals. The signals are carried to the antennas by coaxial cables which are mounted on the tower by cable hangers. These towers extend for considerable heights. Since the cables must be attached to the towers at regular intervals, it is desirable that this connection be made by the installer easily. Existing cable hangers are of two general types. So called snap-in brackets are forced over the cables and the opposite sides of the hanger are pinched together, so that they may be installed in apertures provided in the tower. The resiliency of the hanger then spreads the sides apart to engage the hanger with the tower. Accordingly, some clearance must be provided between the hanger and the cable in order that the sides of the hanger may be pinched together. Another type of prior art cable hanger is slotted to receive the cables or cable guide. However, this type of hanger requires bolting to the tower, and the cable hanger must be installed before the cable is installed.

SUMMARY OF THE INVENTION

The present invention provides a cable hanger which is attached to the tower with a "snap-in" connection and which permits a cable or cable guide to be installed in the cable hanger immediately after the cable hanger is installed on the tower. A clasp is then closed around the cable which biases the snap fitting of the cable guide onto the aperture of the tower, thereby securing the cable guide in place. Accordingly, the hanger may be quickly snapped into the tower and the cable can then be immediately installed in the hanger.

DESCRIPTION OF THE DRAWINGS

FIG. 1 is a view in perspective of a cable hanger pursuant to the teaching of the present invention installs component of a transmitting tower and holding a cable or cable guide;

FIG. 2 is a side elevational view of the combination illustrated in FIG. 1;

FIG. 3 is a plan view of the combination illustrated in FIG. 1;

FIG. 4 is a view end perspective, taken from the front, of a cable hanger made pursuant to the teachings of present invention.

FIG. 5 is a view of the hanger illustrated in FIG. 4;

FIG. 6 is a view taken from the front of the cable hanger illustrated in FIG. 4;

FIG. 7 is a view taken from above the cable hanger illustrated in FIG. 4;

DETAILED DESCRIPTION

Figure 8:
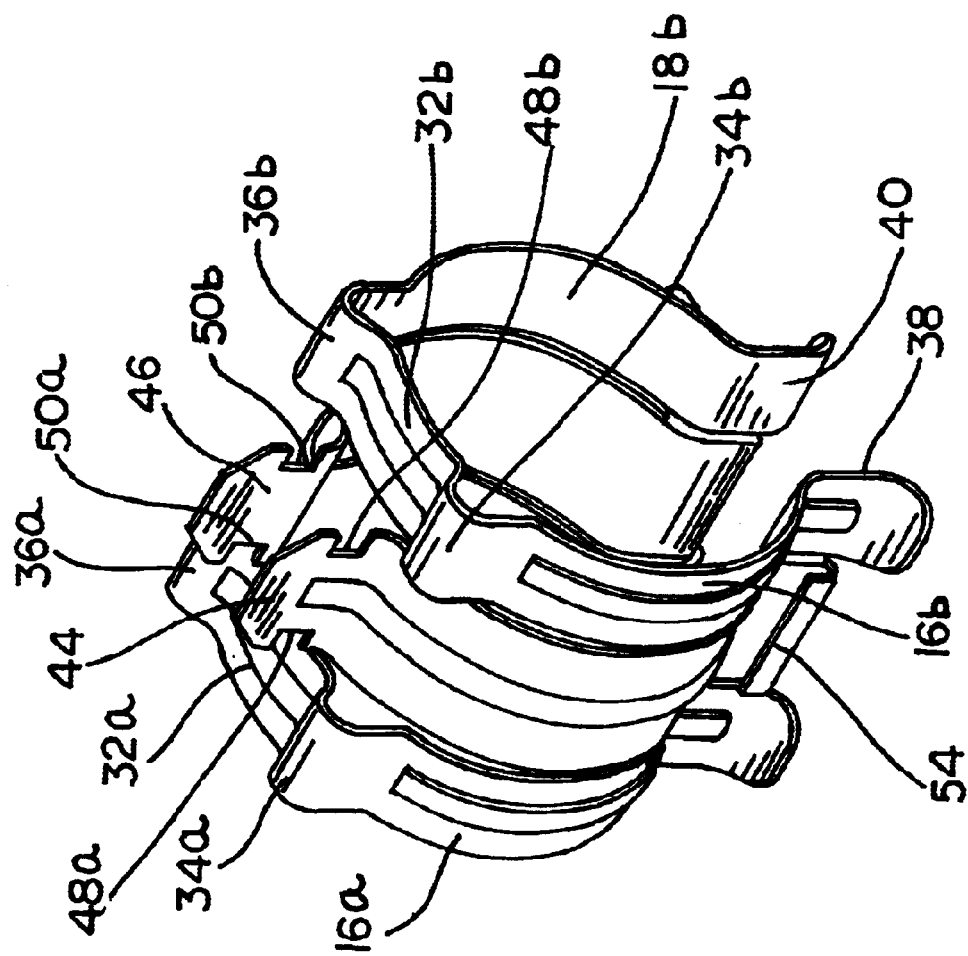
FIG. 8 a perspective view similar to FIG. 4, but taken from below the side opposite the side illustrated in FIG. 4.

Referring now to the drawings, the cable hanger generally indicated by the numeral 10 made pursuant to the teachings of the present invention is installed in an appropriate one of the apertures 12 in a tower cross member 14, which is a component of a standard transmitting tower (not shown). Hanger 10 includes a first pair of circumferentially spaced arms 16, 18 and a second pair of arms 20, 22. The first set of arms 16, 18 are divided into axially offset sections 16a, 16b and 18a, 18b, which define a gap therebetween receiving the second set of circumferentially extending arms 20 and 22. Circumferentially extending arm 20 of the second set is connected to section 16a and 16b of the circumferentially extending arm 16 by connecting portions 24, 26, and the circumferentially extending arm 22 is similarly connected to sections 18a and 18b of circumferentially extending arm 18 by a connecting portion 28, 30. Circumferentially extending arm section 16a is connected to circumferentially extending arm 18 via connecting portion 32a, which includes radially outwardly extending resilient elbows 34a, 36a. Similarly, a connecting section 32b includes elbows 34b and 36b which connect the arm section 16b with the arm section 18b.

The ends of the arm sections 16, 18 and corresponding ends arms 20 and 22 cooperate to define opposite end surfaces 38, 40. Surfaces 38, 40 define a gap G through which a coaxially cable or cable guide generally indicated by the numeral 42 is installed, as will hereinafter be described. As can be seen in FIG. 1, the arms 16, 18 and 20, 22 extends circumferentially around cable or cable guide 42.

Figure 9:
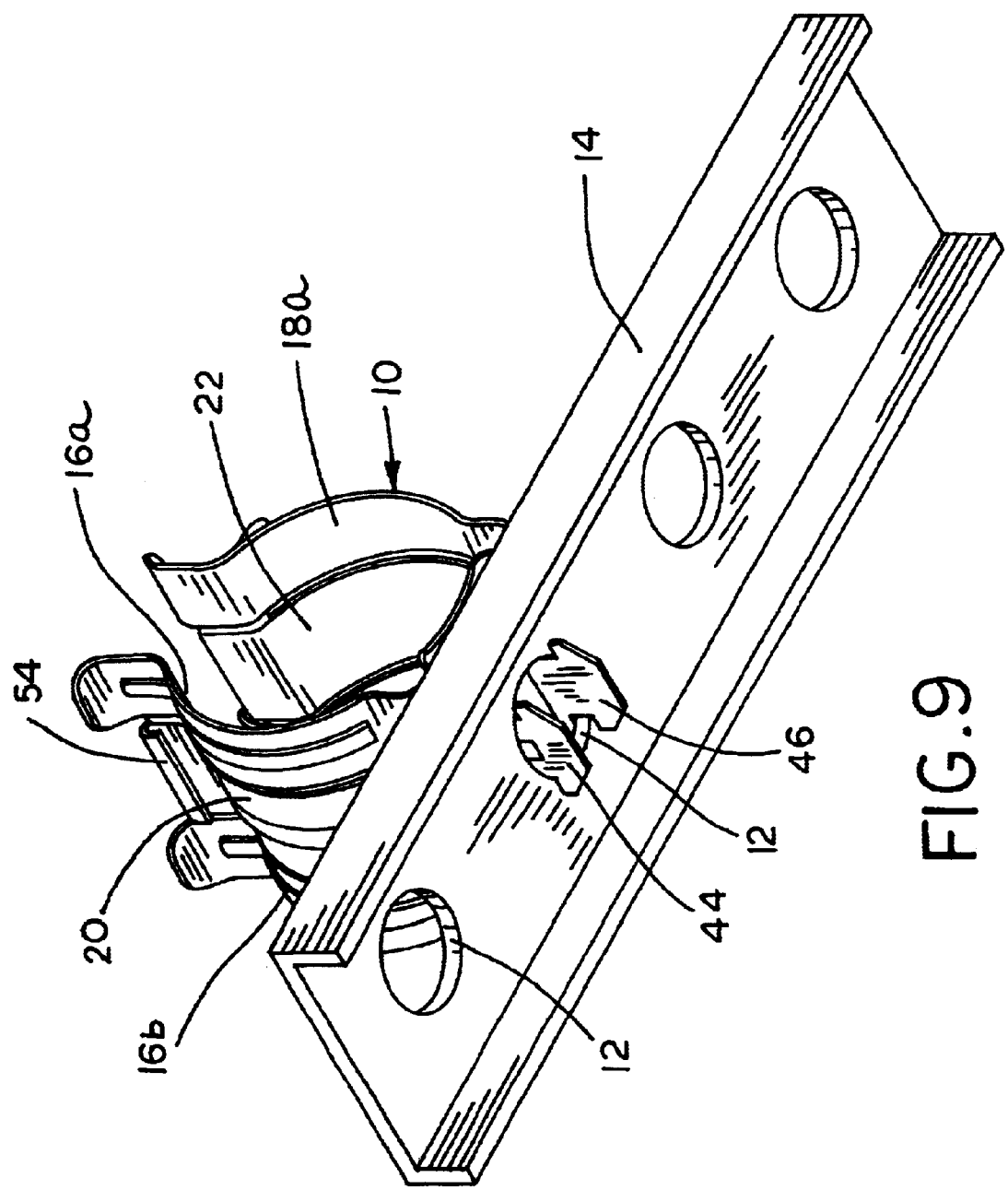
FIG. 9 perspective view taken from behind the tower structural component and illustrating the cable hanger of the present invention installed in a tower structural component.

The ends of the arms 20, 22 opposite the ends define the gap G terminate in radially outwardly extending barbs 44, 46, the barb 44 being defined by grooves 48a, 48b, and the barb 46 being defined by grooves 50a, 50b. The maximum dimension of the barbs 44, 46 is slightly less than the diameter of the aperture 12, so that if the barbs 44, 46 are manually deflected together the barbs will pass through the apertures 12, but when the arms are released, resiliency of the arms 20, 22 spreads the arms apart locking the barbs 44, 46 to the corresponding aperture 12 as is most clearly shown in FIG. 9. Furthermore, the distance between the elbows 34, 36 and the grooves 48a, 48b and the equivalent distance between the grooves 50a and 50b is such that when the barbs 44, 46 are manually installed in the apertures 12, the elbows 34, 36 deflect slightly; however, the resiliency of the elbows upon release of the barbs acts to maintain the barbs in a locking orientation with the bur 14.

A clasp 52 is pivotally mounted on the end of the arm 22 defining the gap G and is swingable between an open position illustrated in FIGS. 4–7 and a closed position illustrated in FIGS. 1–3. In the closed position, the clasp is latched on a turned-over latch 54. The length of the clasp 52 is slightly less than that of the gap G, so that when the clasp is engaged with the latch 54, the arms 20, 22, are spread apart slightly, thereby urging the barbs 44, 46 away from each other, causing the latter to tightly grip against the cross-member 14. At the same time, this latching force is transmitted to the arms 16, 18, causing them to more tightly grip the coaxial cable or cable guide 42.

When the cable or cable guide 42 is to be installed on the aforementioned tower, the installer first installs hanger 10 by forcing the arms 20, 22, toward one another (with the clasp 52 open) to thereby move the barbs 44, 46 toward one another a distance sufficient to permit the barbs to pass through the aperture 12. When the barbs have passed through the aperture 12 and the portion of the cross-member 14 defining the aperture is received within the grooves 48, 50, the arms 20, 22 are released, thereby permitting the resiliency of the arms to spread the barbs apart to thereby latch the arms in aperture 12. At the same time, the elbows 34, 36 exert an axial force on the barbs 44, 46, thereby assuring that the barbs will not become accidentally dislodged. The installer then grasps the cable or cable guides 42 and forces the latter through the gap G, thereby spreading the surfaces 38, 40 by an amount sufficient to urge the barbs 44, 46, apart to cause the latter to more tightly grasp the tower cross member 14. After the cable or cable guide 42, is installed within the hanger 10, the clasp 52 is engaged with the latch.

Figure 10:
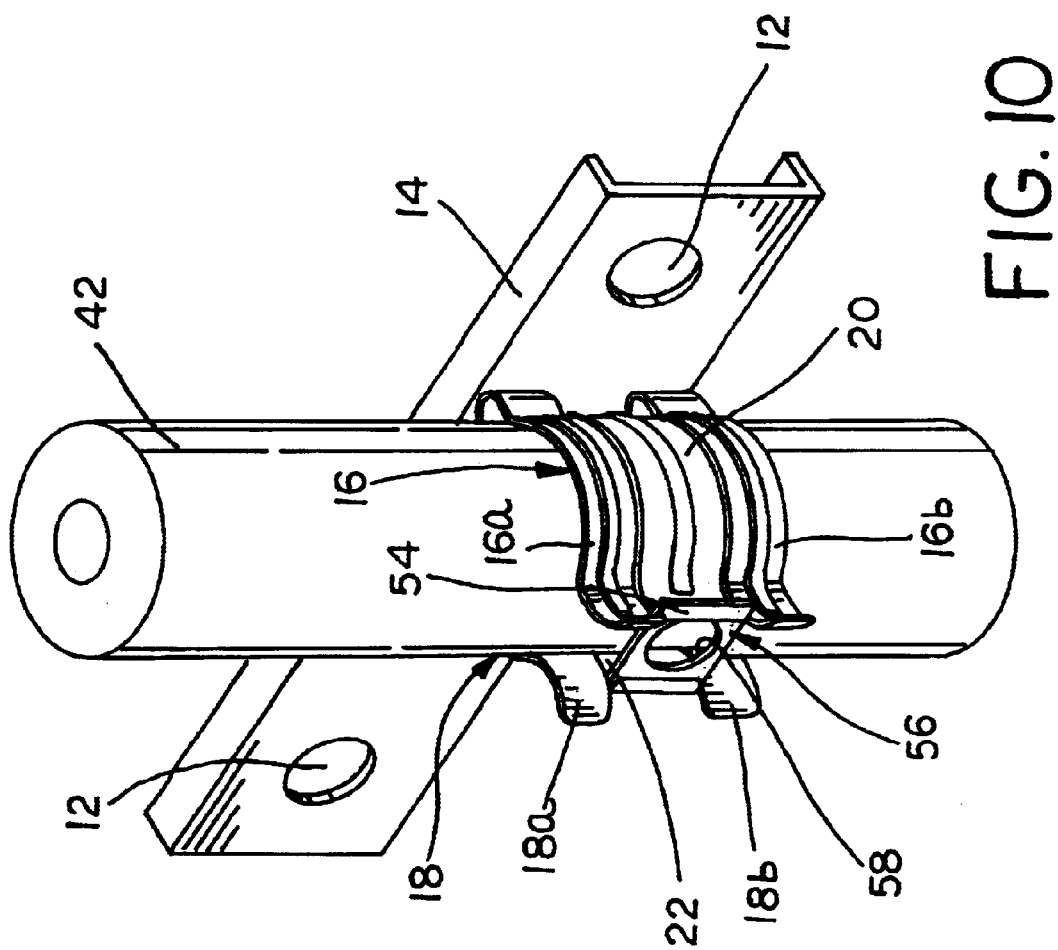
FIG. 10 is a view similar to FIG. 1 but illustrating another embodiment of the invention.

Referring now to the embodiment of FIG. 10, where elements the same or substantially the same as those of the embodiment FIGS. 1–9 retain the same reference numeral, the clasp 52 has been replaced by a clasp 56 consisting of a plate defining an aperture 58 of substantially the same size as the apertures 12. Accordingly, after the clasp 56 is closed and latched by the latch 54, a second cable hanger 10 may be joined to or "piggy backed" with an existing cable hanger 10 installed on the tower cross member 14, thus permitting multiple cables and/or cable guides to be supported from the same aperture 12 of a tower cross member 14. The additional cable hanger 10 is installed in the aperture 58 in exactly the same way that the cable hanger installed in the aperture 12 that is, the arms 20, 22 are forced toward one another to thereby move the barbs 44, 46 towards one another a distance sufficient to permit the barbs to pass through the aperture 58, thereby securing the additional cable hanger (not shown) onto the cable hanger 10 already installed in one of the apertures 12.

What is claimed is:

1. A hanger for supporting elongated members on a supporting structure comprising a first pair of circumferentially extending arms for extending around said elongated member when the member is installed therein, said first pair of arms being joined together at one end thereof and terminating in end surfaces at the other end thereof, each end surface cooperating with the end surface of the other arm to define a gap therebetween, a second pair of circumferentially extending arms each secured to a corresponding one of said first pair of arms but movable independently of said first pair of arms, said second pair of arms terminating in deflectable, resilient portions defining a space therebetween offset from said gap, each of said second pair of arms being movable toward each other to permit installation of said deflectable portions into said supporting structure, said arms causing said deflectable portions to grasp said supporting structure to secure the hanger to said supporting structure, and a clasp mounted on one of said second set of arms, said clasp movable between an open position displaced from said gap and a closed position extending across said gap and engaging a latch on the other arm of said second set of arms.

2. The hanger as claimed in claim 1, wherein said one end of each of said first set of arms is joined by a connecting portion, said connecting portion defining resilient projecting portions for engaging said supporting structure.

3. The hanger as claimed in claim 1, wherein said clasp has a length less than the width of said gap whereby when the clasp is in the closed position the clasp urges the deflectable portions away from each other to cause said deflectable portions to more tightly grasp the supporting structure.

4. The hanger as claimed in claim 1, wherein said supporting structure defines apertures receiving said deflectable portions, said deflectable portions terminating in barbs passing through said apertures when the deflectable portions are deflected toward one another but engaging said structure when the deflectable portions are released and the resiliency of said arms urges the deflectable portions away from one another.

5. The hanger as claimed in claim 1, wherein each of said second set of arms includes a joining portion joined to each of said end surfaces of said first pair of arms.

6. The hanger as claimed in claim 5, wherein the joining portions of said second set of arms terminate in an end surface cooperating with the end surfaces of the first set of arms to define said gap.

7. A hanger for supporting elongated members on a supporting structure comprising a first pair of circumferentially extending arms for extending around said elongated member when the member is installed therein, said first pair of arms being joined together at one end thereof and terminating in an end surface at the other end thereof cooperating with the end surface of the other arm to define a gap therebetween, a second pair of circumferentially extending arms each secured to a corresponding one of said first pair of arms but movable independently of said first pair of arms, said second pair of arms terminating in attachment means for attaching the hanger to the supporting structure, and a clasp mounted on one of said second set of arms and is movable between an open position displaced from said gap and a closed position extending across said gap and engaging a latch on the other arm of said second set of arms, said clasp having a length less than the width of said gap whereby when the clasp is in the closed position the clasp urges the arms comprising the second set of arms away from one another.

8. The hanger as claimed in claim 7, wherein said attachment means includes deflectable, resilient portions defining a space therebetween offset from said gap said deflectable portions terminating in barbs passing through apertures in said supporting structure when the deflectable portions are deflected toward one another but engaging said structure when the deflectable portions are released and the resiliency of said arms urges the deflectable portions away from one another.

9. The hanger as claimed in claim 7, wherein a clasp is mounted on one of said second set of arms and is movable between an open position displaced from said gap and a closed position extending across said gap and engaging a latch on the other arm of said second set of arms.

10. The hanger as claimed in claim 9, wherein said clasp has a length less than the width of said gap whereby when the clasp is in the closed position the clasp urges the deflectable portions away from each other to cause said deflectable portions to more tightly grasp the supporting structure.

11. The hanger as claimed in claim 7, wherein the joining portions of said second set of arms terminates in an end surface cooperating with the end portions of the first set of arms to define said gap.

12. The hanger as claimed in claim 7, wherein said one end of each of said first set of arms is joined by a connecting portion, said connecting portion defining resilient projecting portions for engaging said supporting structure.

\* \* \* \* \*